H. C. STEELE.
TRACTION BELT.
APPLICATION FILED APR. 12, 1917.
1,313,964.
Patented Aug. 26, 1919.
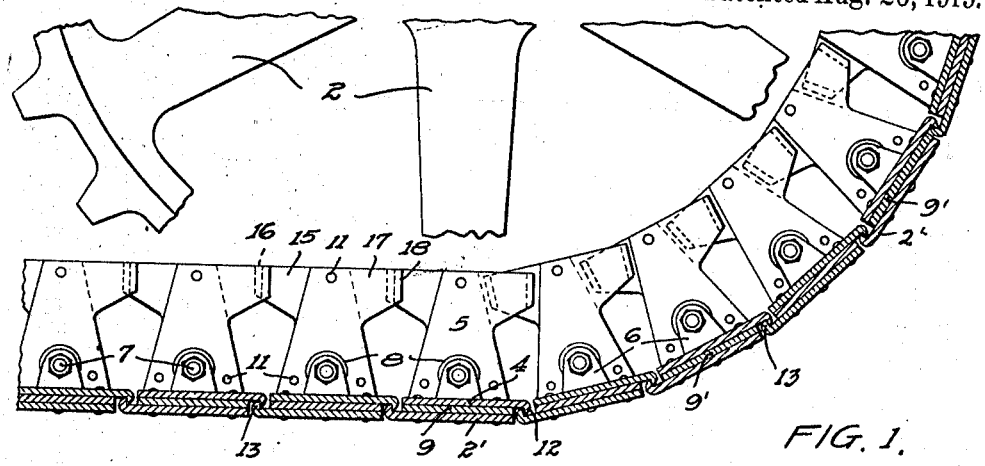
FIG. 1.
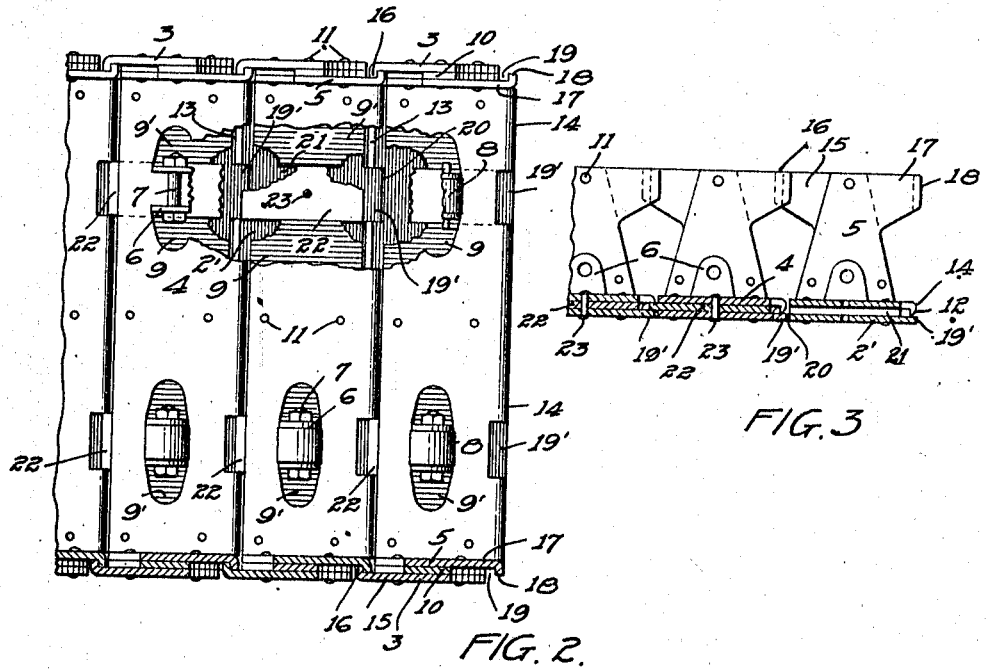
FIG. 3.
FIG. 2.
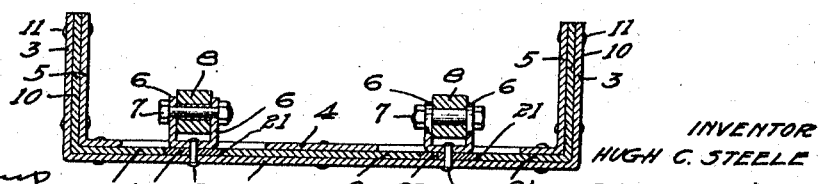
FIG. 4.
WITNESSES
M. R. McInnes
E. A. Paul
INVENTOR
HUGH C. STEELE
BY
Paul & Paul
ATTORNEYS

UNITED STATES PATENT OFFICE.

HUGH C. STEELE, OF MINNEAPOLIS, MINNESOTA.

TRACTION-BELT.

1,313,964.

Specification of Letters Patent. Patented Aug. 26, 1919.

Application filed April 12, 1917. Serial No. 161,508.

*To all whom it may concern:*

Be it known that I, HUGH C. STEELE, a citizen of the United States, resident of Minneapolis, county of Hennepin, State of Minnesota, have invented certain new and useful Improvements in Traction-Belts, of which the following is a specification.

The object of my invention is to provide a traction belt in which pivot pins or similar connecting means are entirely eliminated and a belt in which there will be a minimum of friction between the links, thereby greatly increasing the life of the belt.

A further object is to provide a belt having means for connection between the links which will allow them to adapt themselves to the teeth of the sprocket but will hold the links rigidly in alinement on the ground.

A further object is to provide a means for connecting the links which will permit the convenient separation thereof for renewal or repairs.

The invention consists generally in various constructions and combinations, all as hereinafter described and particularly pointed out in the claims.

In the accompanying drawings forming part of this specification,

Figure 1 is a view, partially in section, of my improved traction belt in position for use, Fig. 2 is a plan view, partially in section, of a portion of the belt, Fig. 3 is a detail sectional view through the transverse middle portion of some of the links, Fig. 4 is a longitudinal sectional view of a link.

In the drawing, 2 represents a suitable sprocket wheel. The belt is composed of a number of corresponding links or sections joined together in such a manner that each link may rock in its bearings on the other link and adapt itself to fit the teeth of the sprocket wheel. The links being all alike, a detailed description of one will be sufficient for all of them.

2' represents the outer or tread plate having upwardly turned end portions 3 at right angles substantially to the middle portion. 4 is an inner plate, fashioned to fit within the plate 2' and having turned-up end portions 5 and also provided on each side of the center with upwardly turned ears 6 having bolts 7 therein for anti-friction rollers 8. I also provide an intermediate plate 9 fitting between the plates 2' and 4 and angle plates 9' having upwardly turned ends 10 interposed between the turned up portions 3 and 5 of the plates 2' and 4. These plates are all secured together by suitable means, such as rivets 11.

The inner plate on one edge has a downwardly turned longitudinal flange 12 and the outer plate 2' is provided on its opposite edge with an upwardly turned flange or lip 13, said flanges extending a sufficient distance beyond the other plates to form recesses into which the oppositely turned lip or flange of the adjacent link may be inserted and have a rocking or rolling bearing therein. For instance, as plainly shown in Fig. 1, the upper plate of one link interlocks with the edge of the lower plate of the adjoining link, the edges of said plates being rounded, as at 14, and there being sufficient clearance between them and the other plates of the links to allow one link to rock upon the adjacent links in bending the chain, as when it is following the periphery of the sprocket wheel.

The ends of the plate 3 have ears 15, the vertical edges of which are provided with lips 16 and the ends of the inner plate 5 have similar ears 17 provided with lips 18, the lips of one plate being turned outwardly and the other inwardly, as shown plainly in Fig. 2. These lips extend a sufficient distance beyond the intermediate or filler plate to provide vertical gaps or recesses 19 and these lips are so positioned that when the links are assembled to form the belt, the ears of one link will lap by those of the adjacent link and the lips thereon will interlock and while permitting the links to rock in following the teeth of the sprocket, will limit the rocking of the links upon each other.

In passing around a sprocket wheel, the interlocking, inwardly projecting portions of the links will follow a shorter arc than the treads of the links, as shown in Fig. 1, and the ears of these inwardly projecting portions will slide upon each other to accommodate themselves to their shorter arc of travel, but when the links are in alinement and traveling on the ground, these interlocking ears will hold them in a substantially rigid position; that is, they cannot buckle or bend or get out of alinement with each other. This is due to the engagement of the vertically arranged lips 18 arranged at right angles to the interlocking lips of the tread portions of the links, the tendency of one pair of lips to permit buckling of the belt being counter-acted by the other pair except when the belt is passing around a sprocket wheel, as described above.

The outer plates 2' are provided on one longitudinal edge with outwardly projecting lugs 19' and the other longitudinal edge has correspondingly shaped recesses 20 oppositely arranged so that when the sections of the links are assembled and the belt put together the lugs 19' on one edge of the plates will enter the recesses 20 in the opposing edge of the abutting plate. I also provide slots 21 in the intermediate plate 9 arranged to register with corresponding slots in the lips 12 and 13, and plates 22 are inserted into these slots in the plate 9 and have their ends protruding therefrom sufficiently to enter the slots in the lips 12 and 13 and overlap the lugs 19'. These plates 22, while permitting the links of the belt to rock upon each other, will prevent the lips of one link from becoming separated from the lips of the abutting links. The members of the links will all be interchangeable and punched or pressed out of sheet metal, or may be forged or cast, if preferred.

I claim as my invention:

1. A traction belt comprising a series of links having tread sections, each provided with oppositely turned, longitudinal lips, the lips of one section being oppositely turned from the adjacent lip of the abutting section for interlocking therewith and having freedom of rocking upon each other and said tread sections having end portions provided with lips for interlocking with each other and limiting the rocking movement of said tread section lips.

2. A traction belt comprising a series of links having tread sections composed of plates provided with oppositely turned longitudinal lips, the lips of one section interlocking with the lips of the abutting sections, said lips having slots therein and plates interposed between the plates of said tread sections and projecting into said slots for preventing the separation of said lips, and the ends of said tread sections having means for limiting the rocking movement thereof one upon the other.

3. A traction belt comprising a series of links having lips formed on their longitudinal edges, and slots provided in said lips, the lips of one link interlocking with the lips of the abutting links, and means bridging the joints between the links and extending into said slots for holding said lips in their interlocking relation.

4. A traction belt composed of a series of links, each comprising an inner and an outer member having oppositely turned longitudinal lips, recesses being formed between the lips of each member and the adjacent longitudinal edge of the other member, the lips entering said recesses and being free to rock therein, and means for preventing separation of said interlocking lips.

5. A traction belt comprising a series of links having tread sections composed of inner and outer plates, the latter having flat tread surfaces, one longitudinal edge of each plate having a lip formed thereon for interlocking engagement with the oppositely turned lip of the other plate in the adjoining link, and means for locking said lips against accidental separation.

6. A traction belt comprising a series of links having lips formed on their longitudinal edges, the lips of one link interlocking with the lips of the abutting links, and means bridging the joints between the links and extending through said lips for holding them in their interlocking relation.

7. A traction belt composed of a series of links, each comprising inner and outer plates having projecting longitudinal edges provided with interlocking lips and means between said inner and outer plates and bridging the joints between the links for holding them together.

8. A traction belt comprising a series of links having their longitudinal edges pivoted one upon the other, said links being provided at their ends with inwardly turned portions, ears mounted on said inwardly turned portions, said ears having lips formed thereon, the lip of one ear being oppositely turned from that of the adjoining ear and contacting therewith for limiting the separation of said ears and the movement of the links one upon the other.

9. A traction belt composed of a series of links, each link having lips formed on its longitudinal edges, the lips of one link interlocking with the oppositely turned lips of the abutting links, said links having flat tread surfaces and means interposed between said tread surfaces and said lips for holding said links in interlocking engagement.

10. A traction belt composed of a series of links, each link comprising an inner and an outer or tread member, the longitudinal edges of said members having interlocking lips formed thereon and means interposed between said members for holding said lips in their interlocking engagement.

In witness whereof, I have hereunto set my hand this 10th day of April, 1917.

HUGH C. STEELE.